Aug. 16, 1938.  H. W. BEECHER  2,126,721

FLUID HEAT EXCHANGE DEVICE

Filed June 6, 1935  2 Sheets-Sheet 1

INVENTOR
Henry W. Beecher
BY
ATTORNEY

Aug. 16, 1938.    H. W. BEECHER    2,126,721
FLUID HEAT EXCHANGE DEVICE
Filed June 6, 1935    2 Sheets-Sheet 2
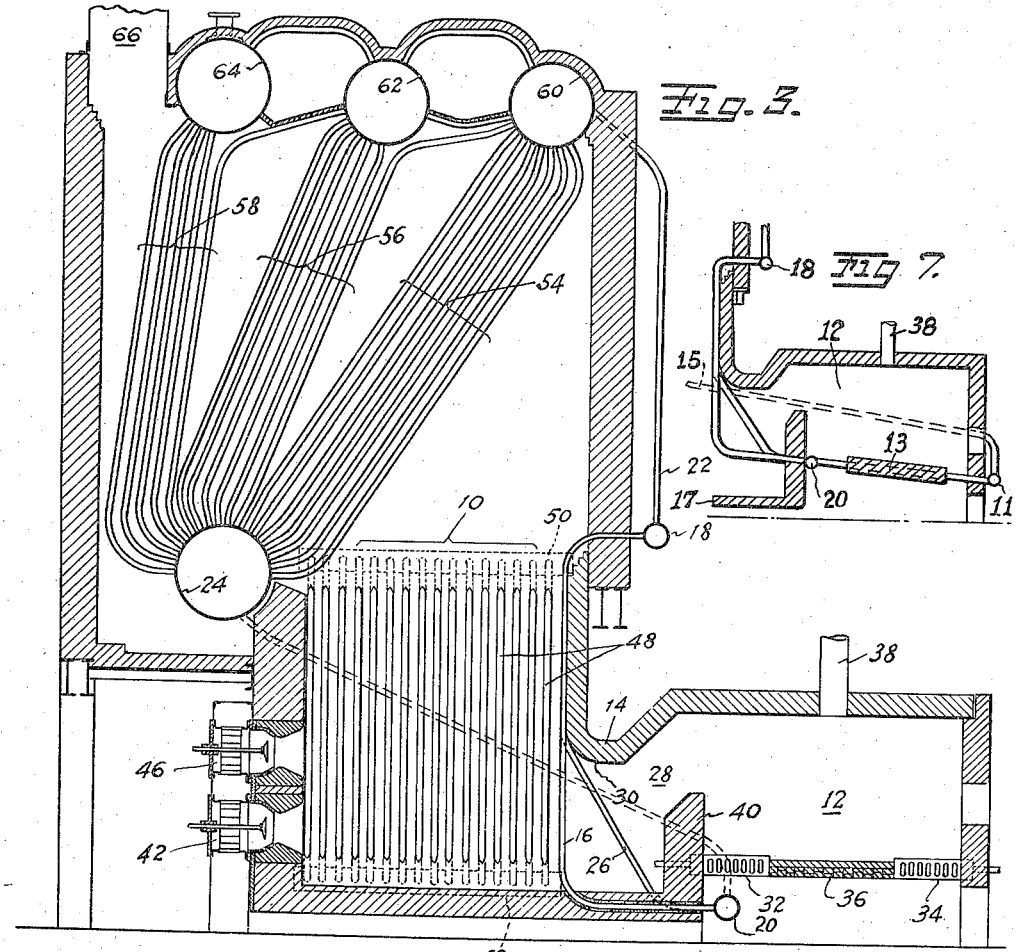
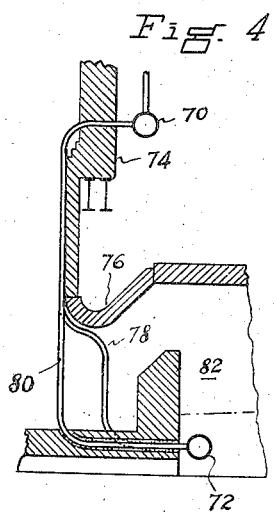
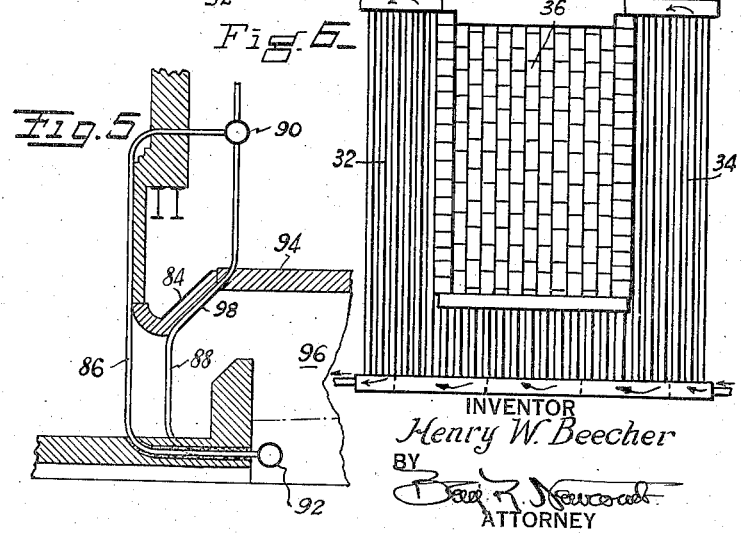
INVENTOR
*Henry W. Beecher*
BY
ATTORNEY

UNITED STATES PATENT OFFICE 2,126,721

FLUID HEAT EXCHANGE DEVICE

Henry W. Beecher, Seattle, Wash., assignor to The Babcock & Wilcox Company, Newark, N. J., a corporation of New Jersey Application June 6, 1935, Serial No. 25,257

20 Claims. (Cl. 122—240)

This invention relates to multiple furnace installations for fuels of different combustion characteristics. It is exemplified herein as a dual furnace steam boiler.

Recent developments pertaining to power generation have emphasized production economy matters as prime factors. The demand for power at lower rates has particularly effected this result where steam operated electric generating plants are used. Intense competition and an over-supply of generating capacity have also made it increasingly important to decrease production costs.

It has been proposed that fuels of low cost be burned, but it has been appreciated that the actual use of such fuels in generating stations would be beset with many difficulties. For example, the conditions pertaining to burning of the by-products of saw mill operations will be considered. These operations have resulted in tremendous accumulations of fuel, including sawdust, shavings, and broken wood particles. Its moisture content is high, not only on account of the fact that it is derived from green timbers but also on account of the fact that it is accumulated in the open where it is affected by rain and snow. It is, therefore, difficult to burn in furnaces of power boilers where high temperatures and high combustion rates are desideratums and where efficiencies must be as high as practicable. Many opposing factors must be considered in the operation of such furnaces. For instance, furnace temperatures must be as much higher than ignition temperatures as possible. Otherwise the fuel cannot be completely burned at an effectively high rate. The high moisture content makes it imperative that heat absorbed during combustion be kept at a minimum. Consequently, absorbing surfaces should not be in sight of the furnace. The desirable high temperatures call for incandescent furnace walls to radiate heat to the ignition space. Ceramic refractory walls are also demanded to keep the furnace temperature high enough. However, if the wall temperatures of the furnace become too high the wood ash in suspension will accumulate on the refractory and cause a fluxing reaction which, on account of the composition of the fused ash, is particularly destructive to the walls. The furnace walls will be destroyed and excessive power costs will be involved by their replacement. Also, considerable time is lost while the furnace is rebuilt. When this results in excessive boiler "outage", effective power generation is impossible. Consequently, the furnace temperatures must be kept within a relatively narrow temperature range. This limits furnace capacity and renders such fuels unsuitable for power plant use, when used alone, by reason of the very large size of the furnace required, and its poor adaptability to operation at both very low and very high combustion rates corresponding to load changes.

Electric power generating stations are particularly subject to "peak load" conditions. That is, for example, there are one or two hours of each day when there is a maximum or near maximum load. At other times the load will vary but will be relatively low. Consequently, steam operated plants require high capacity furnaces which can respond to a wide range of load variation. A furnace burning waste wood fuel cannot effectively meet such peak load requirements and still operate well at very low loads, but it is highly advantageous to use it for the lower load ranges or for more or less steady base load requirements. As a solution of this problem, this invention comprehends the combining of such a waste fuel furnace in a particular way with a furnace of the high heat release type of flexible range, as to rates. The latter burns a high grade fuel such as oil or pulverized coal and is capable of high combustion rates and is also suitable for low rate operation. It is subject to combustion which is almost explosive. High furnace temperatures are attained and high capacities, capable of meeting peak load conditions, characterize this furnace which may have cold absorbing surfaces in sight, without impairment of its performance.

The waste wood furnace is a furnace with a low heat release rate, and certain of its combustion characteristics must be taken into consideration in co-ordinating it with the other furnace. Also, these characteristics must be considered along with the properties of the different fuels used.

In plotting temperatures against furnace heat release rates, for a given fuel there will be a theoretical flame temperature which the actual temperature may approach without ever reaching. This is the temperature for combustion with no moisture, no excess air, and no absorption of radiantly (or otherwise) transmitted heat during combustion. When the same fuel is burned with moisture present, with an excess of air, and with no absorption of heat during combustion, there is another limit, the adiabatic temperature, lower than the theoretical flame temperature, and the actual furnace temperature approaches it as the heat release rate increases.

Absorption of heat during combustion, still further limits the possible furnace temperature. The actual flame temperature does not, however, actually reach the adiabatic limit. Even with no absorption, and still less when there is absorption, actual flame temperatures increase as heat release rates increase under these combustion conditions, but there is always a limit beyond which the temperature cannot go. This limit is relatively low for wet wood and other waste fuels. Consequently, furnaces burning such fuels are classed as cold furnaces, and to prevent them from being too cold, absorption of heat must be limited until after combustion is completed.

When a good fuel, such as oil or pulverized coal is burned there is a relatively rapid increase in furnace temperature as the heat release rate increases because the adiabatic value is very high due to absence of moisture and low excess air requirements. The temperature will relatively quickly exceed the ignition point and will approach, at a relatively small fraction of the possible heat liberation rate, the temperature at which furnace wall damage will occur in the event that the walls are of ceramic refractory material. The problem then, in such furnaces for good fuel, is wall protection by absorbing heat during combustion, to keep temperatures below the value at which wall damages will take place. There is never any difficulty in keeping them above the ignition point.

In the poor fuel furnace, the problem is to keep the temperature above the ignition point so that effective combustion may be maintained, but not too much above the ignition point, in the interest of wall maintenance, and absorption of heat during combustion must be limited or prevented.

The present invention presents a multiple furnace boiler in which both types of furnaces are combined and arranged with reference to the above conditions so that they may be effectively operated separately or simultaneously with the furnace gases from the furnace of low heat release rate always passing through the furnace of the other type before contacting with the steam generating surfaces of the boiler.

Other objects of the invention will appear as the accompanying description proceeds.

The invention will be described with reference to the accompanying drawings, in which:

Fig. 3 is a vertical section through an embodiment of the invention in which a single furnace of the low heat release type is employed.

Fig. 4 is a detailed section showing another form of drop nose arch construction within the scope of the invention.

Fig. 5 is a vertical section illustrating an embodiment of the invention in which the arch is supported between rows of cooling tubes.

Fig. 6 is a view in the nature of a plan, showing the arrangement of the fluid cooled grate bars relative to the refractory fuel support of the secondary furnace.

Fig. 7 is a view in the nature of a vertical section, indicating connections whereby the fluid cooled grate of the secondary furnace is connected into the fluid circulation of the boiler.

Figure 1:
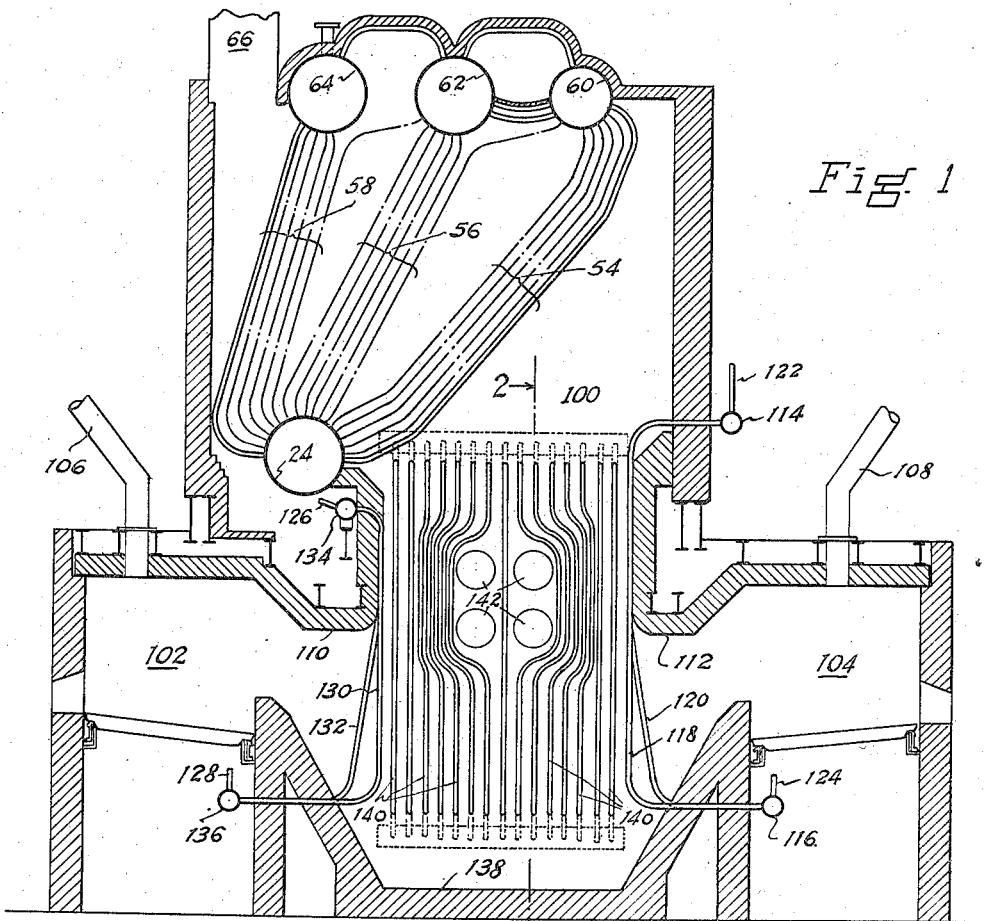
Fig. 1 is a view in the nature of a vertical section showing two furnaces of the "Dutch oven" type discharging their gases through screens formed by water wall tubes of the furnace of the high heat release type.
Figure 2:
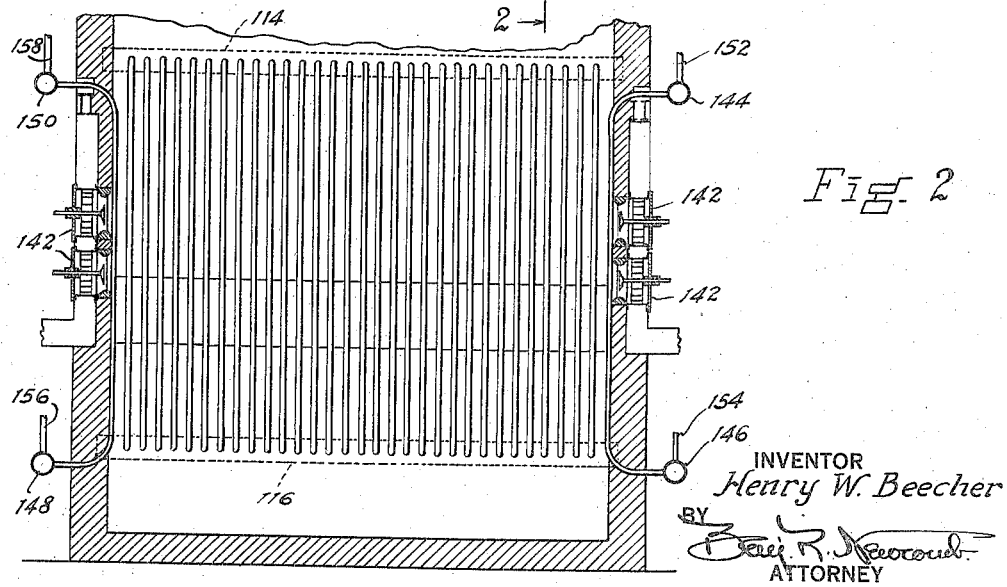
Fig. 2 is a vertical section on the line 2—2 of Fig. 1.

In the steam boiler installation indicated in Fig. 3 of the drawings there are two furnaces. One is an oil fired water wall furnace 10. The other, 12, is fired by waste wood products. Between these two furnaces is the drop nose arch 14 which acts as a screen. It prevents excessive wall temperatures in furnace 12 when the furnace 10 is operating by limiting heat radiation from the latter. It is also a target for flame impact when the furnace 12 is in operation. Flying wood ash is then apt to fuse and create a damage hazard which leads to excessive replacement and damage costs where the arch is constructed solely of ceramic refractory material. Hence, in the structure indicated in Fig. 3 the arch is protected by extensions of wall cooling tubes 16 of the furnace 10, preferably connected into the water circulation of the boiler.

The tubes 16 connect an upper header 18 to a lower header 20 both of which are preferably not contacted by furnace gases. The former may be connected by an uptake 22 with a steam and water drum of the boiler while the latter is preferably conected to the mud-drum 24.

The protection of the arch 14 against overheating is increased and the resistance of the tube screen to the flow of furnace gases from the furnace 12 is decreased by arranging alternate tubes 26 as shown in Fig. 3. They pass across the outlet 28 at positions spaced from the tubes 16 and are in contact with the ceramic material of the arch 14 over a greater area of the arch. They may be said to be curved around the nose of the arch as indicated at 30.

The furnace 12 is provided with a water cooled grate the sections 32 and 34 of which are shown on opposite sides of a refractory fuel support 36. Directly over the latter is the outlet 38 of a conveyor by which fuel is delivered. It falls upon the support 36 and its combustion is supported by the air which passes upwardly through the bars of the grate around the fuel.

The furnace gases from the furnace 12 pass upwardly over the bridge wall 40 and then downwardly along the arch 14 between the tubes 16 and 26 which act as a screen across the outlet 28.

When the furnace 10 is fired by oil burners 42 and 46, its walls are kept below the fusion temperature of the wood ash by the wall cooling effect of the previously mentioned wall tubes and by wall tubes 48 which are similarly arranged between headers 50 and 52 connected into boiler circulation. Like wall tubes may be arranged along the remaining furnace walls.

After emerging from the furnace 12, the furnace gases pass through the high heat release furnace and contact with the steam generating tubes of the boiler. As shown in the drawings, these tubes are arranged in three downwardly converging banks 54, 56 and 58 respectively connecting the steam and water drums 60, 62 and 64 to the lower drum 24. Suitable baffles may be provided so that the furnace gases will pass over these banks of tubes in three or more separate gas passes. In some instances, however, the boiler tubes may be so arranged that the gases pass across all of the steam generating tubes in a single gas pass. In any event, after the gases have had an effective proportion of their heat extracted therefrom, they pass from the boiler through the flue 66 which is connected to a suitable stack.

In the Fig. 4 embodiment, the header 70 is connected to the lower header 72 by two sets of tubes. The tubes of each set extend through the wall 74 of the primary furnace and thence downwardly along that wall. At the point of juncture of the arch 76 and the wall 74 the tubes of the sets diverge. The tubes 78 are bent partly around the nose of the arch while the tubes 80 pass directly across the outlet of the furnace 82.

The arch 84 of the Fig. 5 modification is protected on both sides by tubes which converge downwardly along these sides. As shown, the tubes 86 are arranged in the same manner as the tubes 80 of Fig. 4, but the remaining tubes 88 are not wall tubes of the primary furnace. They are circulation tubes directly connecting the headers 90 and 92 and extending through the upper wall 94 of the furnace 96. They also have intermediate portions 98 extending along one side of the arch.

The boiler shown in Fig. 1 is similar to that shown in Fig. 3, and the same numerals are therefore used to indicate similar component parts. Beneath the front back 54 of steam generating tubes of the boiler is the primary furnace 100. The latter is interposed relative to the opposite secondary furnaces 102 and 104 and it acts as a flue for both.

Fuel is delivered to the secondary furnaces through conveyors 106 and 108 which may be located above central refractory parts of water cooled grates each similar to that shown in Fig. 3. Air passes up through the grates to support combustion of the fuel and the resulting combustion products pass under the arches 110 and 112 to the primary furnace.

At one side of the furnace 100 headers 114 and 116 are connected by tubes 118 and 120 which are arranged as combined wall tubes and screen tubes in the same manner as the tubes 16 and 26 of the Fig. 3 embodiment. Fluid circulation through the wall tubes is accomplished by reason of the circulatory connections 122 and 124 which may be connected to the upper and lower boiler drums. Similar connections 126 and 128 are provided for the similarly arranged tubes 130, 132 and headers 134, 136 at the opposite side of the primary furnace.

In the primary furnace, and positioned between the outlets of the furnaces 102 and 104 is the ash receiving space 138. Above this there are wall tubes 140 some of which have offset or bent-out portions adjacent the burners 142. The latter are shown arranged in two upright rows between which there may be one or more wall tubes which are without offset portions alongside the burners. Circulatory connection for the burner wall cooling tubes is provided by the headers 144, 146, 148, 150 and the boiler communicating conduits 152, 154, 156, 158.

Fig. 6 of the drawings illustrates a furnace grate construction in which the hollow grate bars are connected in separate groups to separate headers or separate header sections in such a way that there is a back and forth circulation of the water through the sections from one side of the furnace to the other. The fluid circulation of the grate may be provided for as indicated in Fig. 7 of the drawings. This figure indicates an inclined imperforate fuel support 13 associated with inclined tubes connected to the headers 11 and 12 which in turn are connected to the water space of the boiler circulation system by a conduit 15. The upflow of water from the header 20 takes place through tubes communicating with the header 18 and through that header, with the boiler circulatory system.

Although the invention has been described with reference to the particular structures indicated in the drawings, it is not limited to all of the details thereof, but, rather, is of a scope commensurate with the subject matter claimed.

What is claimed is:

1. In a multiple furnace steam generator, a furnace of high heat release rate capacity having water cooled walls and fuel burners, a furnace of low heat release rate discharging its combustion products through the first furnace and having means therein for burning a fuel of high moisture content, a drop nose arch between the two furnaces, wall tubes of the first furnace extending along a side of the arch and having extensions forming a screen between the furnaces, and means connecting these tubes into fluid circulation.

2. In combination, a water tube steam boiler, a primary furnace burning a fuel of high heat release capacity, a secondary furnace discharging its gases into the primary furnace and having means for burning a fuel of high moisture content, wall cooling tubes for the primary furnace connected into the boiler circulation, a drop nose arch between the two furnaces to direct the flue gases from the first furnace downwardly at the point where they enter the primary furnace, some of the wall tubes having extensions which form a screen between the two furnaces and act as wall cooling tubes for the arch.

3. In combination, a steam boiler, a furnace the gases from which pass directly across the tubes of the boiler, a secondary furnace having means for burning a fuel of high moisture content and discharging its gases through the first mentioned furnace, a refractory drop nose arch between the two furnaces, and wall cooling tubes extending along a wall of the first furnace and extending along a part of the arch and beyond it to form a screen for the gases of the second mentioned furnace.

4. In combination, a water tube steam boiler having steam generating tubes, a primary furnace of high heat release capacity burning a fuel of high flame temperature and discharging its gases directly across the steam generating tubes, a second furnace having means therein, for burning a fuel of high moisture content, means whereby all of the gases from the second furnace discharge downwardly and into and through the primary furnace, wall tubes, headers, tubes connecting said headers and forming a screen across the exit for the gases of the second mentioned furnace, some of said tubes acting as wall cooling tubes for the second furnace and others of said tubes acting as wall cooling tubes for the first furnace.

5. In combination, a water tube steam boiler having steam generating tubes, an oil burning furnace discharging its gases directly across the steam generating tubes, a second furnace burning waste wood fuels of high moisture content and discharging all of its gases into the first furnace, a drop nose arch between the two furnaces directing the discharge gases of the second furnace downwardly into the first, wall cooling tubes connected into the boiler circulation and extending along one side of the arch, extensions of said tubes below the arch forming a screen for the furnace gases.

6. In combination, a water tube steam boiler having steam generating tubes extending across gas passes, a primary furnace discharging its gases directly into said gas passes, fuel burners for burning finely divided fuel in suspension in the primary furnace, secondary furnaces arranged on opposite sides of the primary furnace and discharging their gases downwardly into the first furnace, means for burning waste wood fuels of high moisture content in the secondary furnaces, drop nose arches between the secondary furnaces and the primary furnace and directing the discharge from the secondary furnaces downwardly, wall cooling tubes for the primary furnace extending along one side of each of the drop nose arches and extending therebeyond across the outlets of the secondary furnaces for forming screens for those furnaces, some of said wall cooling tubes being bent at the arches to form additional protection therefor and to decrease the resistance to the flow of furnace gases into the primary furnace.

7. In a dual furnace boiler, a furnace having water cooled walls and fuel burners, a second furnace discharging its gases through the first furnace and having means therein for burning a fuel of high moisture content, a refractory drop nose arch between the two furnaces, wall tube headers, means connecting these headers into the fluid circulation of the boiler, and wall tubes connecting the headers, some of the wall tubes being bent so that they extend along the fire side of the arch to protect same.

8. In combination, a water tube steam boiler, a primary furnace having a capacity for high heat release rates, a secondary furnace of low heat release rate capacity discharging its gases into the primary furnace and having means therein for burning a fuel of high moisture content, a row of spaced wall cooling tubes of the primary furnace connected into the boiler circulation, a drop nose arch between the two furnaces to direct the flue gases from the first furnace downwardly at the point where they enter the primary furnace, some of the wall tubes having extensions which form a screen between the two furnaces and act as wall cooling tubes for the arch, and another row of tubes connected into fluid circulation and extending across the outlet of the secondary furnace, the last mentioned row of tubes presenting arch cooling tube parts which converge downwardly relative to the first tubes where the arch is interposed.

9. In combination, a steam boiler, a primary furnace the gases from which pass directly across the tubes of the boiler, a secondary furnace having means therein for burning a fuel of high moisture content and discharging its gases through the primary furnace into the boiler, a drop nose arch between the two furnaces, and a row of wall cooling tubes extending along a wall of the first furnace and extending along a part of the arch and beyond it to form a screen for the gases of the second mentioned furnace, some of said tubes being bent out of the row and around the nose of the arch.

10. In combination, a water tube steam boiler having steam generating tubes, a primary furnace burning a fuel of high heat release capacity and discharging its gases directly across the steam generating tubes, a second furnace having means therein for burning a fuel of high moisture content, means whereby gases from the second furnace discharge downwardly and into and through the primary furnace, wall tubes, headers, tubes connecting said headers and forming a screen across the exit for the gases of the second mentioned furnace, a refractory arch between said furnaces some of said tubes acting as arch cooling tubes on the second furnace side of the arch and others of said tubes acting as wall cooling tubes for the first furnace.

11. In combination, a water tube steam boiler having steam generating tubes, a primary furnace of high heat release rate capacity discharging its gases directly across the steam generating tubes, a second furnace burning waste wood fuels of high moisture content and discharging its gases into the first furnace, a drop nose arch between the two furnaces directing the discharge gases of the second furnace downwardly into the first, a set of wall cooling tubes connected into the boiler circulation and extending along one side of the arch, extensions of said tubes below the arch forming a screen for the furnace gases, a second set of fluid circulation tubes extending along the opposite side of the arch and thence across the outlet of the second furnace at a position spaced from said extensions.

12. In a dual furnace boiler, a furnace having water cooled walls and fuel burners, a second furnace discharging through the first furnace and having means including a water cooled grate for burning a fuel of high moisture content, a drop nose arch between the two furnaces, headers, means connecting these headers into the fluid circulation of the boiler, and wall tubes connecting the headers, some of the wall tubes being bent so that they extend along the second furnace side of the arch to protect same.

13. In combination, a water tube steam boiler, a primary furnace burning a fuel of high heat release capacity, a secondary furnace discharging its gases into the primary furnace and having means for burning a fuel of high moisture content, wall cooling tubes for the primary furnace connected into the boiler circulation, a drop nose arch between the two furnaces to direct the flue gases from the secondary furnace downwardly at the point where they enter the primary furnace, some of the wall tubes having extensions which form a screen between the two furnaces and act as wall cooling tubes for the arch, a tubular water cooled grate for the secondary furnace, and a header common to some of the wall tubes and the tubular bars of the grate.

14. In combination, a primary furnace burning a high grade fuel, a secondary furnace discharging its gases into the primary furnace and having means associated therewith for burning a fuel of high moisture content, walls presenting an opening into the primary furnace which is an outlet for the secondary furnace, one of said walls constituting a wall of the primary furnace which is located intermediately of the two furnaces, fuel burning means in a wall of the primary furnace opposite said intermediate wall directing flame and combustion products toward said intermediate wall, spaced wall cooling tubes associated with the intermediate wall and located in a screening position across the outlet of the secondary furnace, and means for connecting said tubes into a fluid circulation, said tubes being located in a position toward which the flames from both furnaces are directed.

15. In combination, a water tube steam boiler, a primary furnace from which hot gases pass across the heat absorbing surfaces of the boiler, secondary furnaces having gas outlets leading to the lower part of the primary furnace, the secondary furnaces being positioned in opposed relationship on opposite sides of the primary furnace so that the gases discharging from the secondary furnaces tend to converge toward the center of the primary furnace, primary furnace walls positioned above said outlets and extending in a direction substantially normal to the path of the gases passing from the secondary furnaces including spaced tubes connected into fluid circulation so as to cool said walls, said tubes having extensions extending downwardly from the walls to form screens across said secondary furnace outlets, additional walls connecting the first mentioned walls, fuel burning means extending through said additional walls so as to direct flame and combustion products in opposite directions toward the center of the primary furnace, and spaced tubes connected into boiler circulation and acting to cool said additional walls, some of said last mentioned tubes being bent outwardly around said fuel burning means in the plane of the tube wall to form fluid cooled ports for the fuel burning means.

16. In combination, a water tube steam boiler, a primary furnace from which hot gases pass across the heat absorbing surfaces of the boiler, secondary furnaces having gas outlets leading to the lower part of the primary furnace, the secondary furnaces being positioned in opposed relationship on opposite sides of the primary furnace so that the gases discharging from the secondary furnaces tend to converge toward the center of the primary furnace, primary furnace walls positioned above said outlets and extending in a direction substantially normal to the path of the gases passing from the secondary furnaces and including spaced tubes connected into fluid circulation so as to cool said walls, said tubes having extensions extending downwardly from the walls to form screens across said secondary furnace outlets, additional walls connecting the first mentioned walls, fuel burning means extending through said additional walls so as to direct flame and combustion products in opposite directions toward the center of the primary furnace, and spaced tubes connected into boiler circulation and acting to cool said additional walls.

17. In combination, a primary furnace burning a high grade fuel, a secondary furnace discharging its gases into the primary furnace and having means associated therewith for burning a fuel of high moisture content, walls presenting an opening into the primary furnace which is an outlet for the secondary furnace, one of said walls also constituting a primary furnace wall located intermediately of the two furnaces, fuel burning means in a primary furnace wall other than said intermediate wall and directing flame and combustion products toward said intermediate wall, spaced wall cooling tubes associated with the intermediate wall, and means for connecting said tubes into a fluid circulation, said tubes being located in a position toward which the flames from both furnaces are directed.

18. In a multiple furnace installation, a primary furnace of high heat release capacity burning a high flame temperature fuel, fluid cooled means protecting the walls of the primary furnace, and a refractory walled secondary furnace burning a fuel of such low flame temperature and such high moisture content that high ignition temperatures are necessary, said means including tubes extending across the path of the furnace gases passing from the secondary furnace into the primary furnace, and refractory wall means disposed between said furnaces and contributing to high ignition temperatures in the secondary furnace by shielding said tubes from radiant heat from the secondary furnace.

19. In a multiple furnace installation, a primary furnace of high heat release capacity burning a high flame temperature fuel, fluid cooled means protecting the walls of the primary furnace, and a secondary furnace burning a fuel of such low flame temperature and such high moisture content that high ignition temperatures are necessary, the secondary furnace having its ignition space bounded by ceramic refractory walls, means forming an opening for the passage of furnace gases from one furnace to the other, said means including tubes exposed to the heat of the furnace gases which pass from the secondary furnace into the primary furnace, and ceramic refractory wall means disposed between said furnaces and contributing to high ignition temperatures in the secondary furnace by shielding said tubes from radiant heat from the secondary furnace, said wall means minimizing the absorption of heat radiantly transmitted from the ignition space of the primary furnace to the wall defining surfaces of the secondary furnace.

20. In a multiple furnace installation, a primary furnace of high heat release capacity burning a high flame temperature fuel, fluid cooled means protecting the walls of the primary furnace, and a refractory walled secondary furnace burning a fuel of such low flame temperature and such high moisture content that high ignition temperatures are necessary, an outlet of the secondary furnace connecting the two furnaces, said means including tubes forming a screen extending across the path of the furnace gases passing from the secondary furnace into the primary furnace through said outlet, the screen tubes having wall tube parts in wall cooling relationship to the furnace wall structure adjacent the entrance of the secondary furnace combustion products into the primary furnace.

HENRY W. BEECHER.